UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BLACK DISAZO DYE.

SPECIFICATION forming part of Letters Patent No. 644,236, dated February 27, 1900.

Application filed October 17, 1898. Serial No. 693,800. (Specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in the Manufacture of Black Disazo Dyes, of which the following is a specification.

In previous applications for Letters Patent, Serial Nos. 690,649, 690,650, and 690,651, filed September 10, 1898, I have described secondary disazo dyes derived from ortho-nitro-ortho-amido-phenol-sulfo-acid, and in an application of even date herewith I describe such dyes derived from ortho-nitro-para-amido-phenol-ortho-sulfo-acid.

The present invention relates to disazo dyes derived from a new nitro-amido-phenol-sulfo-acid which I have discovered. The said new nitro-amido-phenol-sulfo-acid is probably a para-nitro-ortho-amido-phenol-ortho-sulfo-acid, and, although I make no claim to the manufacture of this new acid, in this application I describe a method of producing it, because no description has hitherto been published.

In order to prepare my new nitro-amido-phenol-sulfo-acid, I use di-nitro-phenol-sulfo-acid, which is mentioned in the German patent, No. 27,271, of June 8, 1883, and can be obtained by treating 2-4 di-sulfo-acid of phenol, as described by Post, (*Berichte* 7, 1323.) I have found that this same di-nitro-phenol-sulfo-acid can also be obtained by nitrating para-nitro-phenol-ortho-sulfo-acid. To convert this di-nitro-phenol-sulfo-acid into my new initial material, I reduce it in the form of its di-potassium salt with ferrous sulfate and sodium carbonate or with sodium sulfid, as is illustrated by the following example:

Mix about sixty (60) parts of the potassium salt of ortho-para-di-nitro-phenol-ortho-sulfo-acid with forty (40) parts of water and add a concentrated solution of eleven and one-fifth ($11\frac{1}{5}$) parts of potassium hydroxid in water. In this way the di-potassium salt is obtained. Stir the mixture and keep it cool and add about one hundred and thirty-five (135) parts of crystallized sodium sulfid dissolved in an equal quantity of water. During this operation take care that the temperature does not rise above 20°. The potassium salt of the di-nitro-acid gradually dissolves, and the potassium salt of the new nitro-amido-phenol-sulfo-acid separates out in small reddish crystals. Collect by filtering, redissolve in water, and add a mineral acid in order to precipitate the new nitro-amido-phenol-sulfo-acid as the free acid. The new nitro-amido-phenol-sulfo-acid so obtained crystallizes from the hot aqueous solution, giving almost colorless crystals, which contain water of crystallization. The mono-potassium salt is readily soluble in hot water, giving a reddish-yellow color. On cooling it separates out in beautiful brilliant crystals. The di-potassium salt is very readily soluble in water, giving a red color. It can be precipitated by the addition of alcohol. I use this new sulfo-acid for the manufacture of my new secondary disazo dye-stuffs. These new dye-stuffs possess great strength of coloring power and an excellent fastness to light. They give black shades on wool and similar animal fiber, and when the dyed fabrics are treated with chromates shades very fast to washing and fulling are obtained, and at the same time the color is changed toward green- or deep- black.

In the present application I desire to claim generically the new disazo dyes from para-nitro-ortho-amido-phenol-ortho-sulfo-acid and alpha-naphthylamin or the 1.6 or 1.7 alpha-naphthylamin-sulfo-acids known as "Cleve's," either alone or as a mixture, as middle components, and alpha-naphthol-alpha-sulfo-acid (1.4 or 1.5) beta-naphthol, beta-naphthol-di-sulfo-acid-R. 1.8 dioxynaphthalene sulfo-acids, and alpha or beta naphthylamin and alkyl derivatives thereof as end components, and specifically I wish to claim the disazo dye from the new nitro-amido-phenol-sulfo-acid with alpha-naphthylamin as middle component and alpha-naphthol-alpha-sulfo-acid (1.4 or 1.5) as end component.

The following examples will serve to illustrate the manner in which my invention can best be carried into practical effect and my new group of dyes obtained. The parts are by weight:

*Example 1—Combination of the new nitro-amido-phenol-sulfo-acid with alpha-naphthyl-*

*amin.*—Mix about two hundred and thirty-four (234) parts of para-nitro-ortho-amido-phenol-sulfo-acid with about six thousand (6,000) parts of water and add about one hundred and six (106) parts of calcined soda, so as to produce a solution. Next precipitate the free acid in a finely-divided state by adding about four hunded and twenty (420) parts of hydrochloric acid, (containing about thirty-two per cent. HCl.) Add a concentrated solution of sixty-nine (69) parts of sodium nitrite in order to diazotize. The diazo compound is very stable and readily soluble in water, giving a greenish-yellow solution. Pour the diazo solution into a solution of about one hundred and sixty-five (165) parts of alpha-naphthylamin in one hundred and fifty-four (154) parts of hydrochloric acid (containing about thirty-two per cent. HCl) diluted with about twenty thousand (20,000) parts of water. A light-yellow paste of crystals usually separates out in the first place, which apparently consists of the naphthylamin salt of the diazo-sulfo-acid. Heat the mixture to a temperature of about 70° centigrade. This paste will disappear and gradually the violet-colored disazo dye will form. Stir for twenty-four (24) hours while maintaining the temperature at about 70°. The coloring-matter separates out practically completely in the form of a violet crystalline precipitate. Filter hot and wash with hot water. The combination with Cleve's naphthylamin-sulfo-acid is similarly effected, though the appearances presented during the reactions differ in that the formation of a salt of the disazo-sulfo-acid cannot be noticed. The intermediate product in this case can be precipitated, if necessary, by means of the chloride of potassium.

*Example 2—Production of the new disazo coloring-matter, using alpha-naphthol-alpha-sulfo-acid.*—Dissolve about three hundred and eighty-eight (388) parts of the azo product obtained as described in Example 1 in about from twelve (12,000) to fifteen thousand (15,000) parts of hot water rendered alkaline with about two hundred and twenty-nine (229) parts of caustic-soda lye (containing about thirty-five per cent. Na.O.H.) Cool the solution, and then add about four thousand (4,000) parts of ice and sixty-nine (69) parts of sodium nitrite and about five hundred and seventy (570) parts of hydrochloric acid, (containing about thirty per cent. real HCl.) The diazo compound separates out in the form of small brownish crystals. Pour the mixture directly into a solution rendered alkaline with soda and about two hundred and seventy-one (271) parts of the sodium salt of alpha-naphthol-alpha-sulfo-acid, (1.4-1.5.) The formation of color is rapidly completed. Add common salt to completely precipitate the coloring-matter, filter, wash, and purify by redissolving. Similarly the production of the other members of my new group of coloring-matters can be effected. If alpha-naphthylamin be used as component, it is, as will be well understood, desirable to effect the combination in acid solution and to convert the coloring-matter subsequently into its sodium salt.

My new group of coloring-matters are generally made in the form of a dark-colored powder and are characterized particularly by their behavior on reduction.

To test the coloring-matter, dissolve one (1) part in about one hundred (100) parts of hot water and add about ten (10) parts of twenty-per-cent. ammonia solution. Boil the solution and add one to three parts of sulfid of ammonia. In most cases one part will be sufficient. The reduction takes place in a few moments, and a deep-red to brown solution is obtained. The color of the solution obtained depends to a certain extent upon the quantity of sulfid of ammonia taken. If a spot of the solution on filter-paper be treated with hydrochloric acid, it only becomes weakly reddish. Cool, precipitate with an excess of hydrochloric acid, filter from the red coloring-matter or the decomposition products which separate out. The filtered solution contains regenerated para-nitro-ortho-amido-phenol-ortho-sulfo-acid. Diazotize this filtered solution with sodium nitrite, filter, and convert into a characteristic azo dye by combination of the filtered solution with R-salt in soda-alkaline solution.

The coloring-matter obtained is violet, and its aqueous solution becomes intensely red on treatment with hydrochloric acid and intensely blue on treating with acetic acid. In this reduction the para-nitro-ortho-amido-phenol-ortho-sulfo-acid is regenerated and diazotized and converted into the characteristic coloring-matter with R-salt.

The specific coloring-matter which I desire to claim in these Letters Patent behaves on reduction exactly as described for the whole group of coloring-matters and is further characterized by dissolving in concentrated sulfuric acid, giving a moss-green solution. On dissolving in about one thousand times its weight of water a blue solution is obtained which, as seen in bulk, remains practically unchanged in color on adding a little caustic-soda solution. On addition of hydrochloric acid to this solution the color becomes violet-red to crimson. The color may change on standing, and with large excess a violet-red precipitate is formed. Ferric chlorid added to the solution gives a violet to violet-red precipitate.

What I claim is—

1. As a new product the disazo coloring-matters which can be obtained from para-nitro-ortho-amido-phenol-ortho-sulfo-acid and which yield para-nitro-ortho-amido-phenol-ortho-sulfo-acid on reduction with ammonium sulfid in ammoniacal solution, all as hereinbefore described.

2. As a new product the new disazo coloring-matter which can be derived from para-nitro-ortho-amido-phenol-ortho-sulfo-acid and alpha-naphthylamin as middle component, and alpha-naphthol-alpha-sulfo-acid (1.4 or 1.5) as end component, and which yields para-nitro-ortho-amido-phenol-ortho-sulfo-acid on reduction with ammonium sulfid in ammoniacal solution, and by being readily soluble in water and soluble in concentrated sulfuric acid, giving a moss-green solution, and giving with water a blue solution the color of which on the addition of a little caustic soda is practically unchanged when seen in bulk, hydrochloric acid turning this solution violet-red to crimson which may change on standing, a large excess forming a violet-red precipitate, and the addition of ferric chlorid giving a violet to violet-red precipitate, all substantially as hereinbefore described.

In testimony whereof I have hereunto set my hand in the presence of two subscribing witnesses.

PAUL JULIUS.

Witnesses:
ERNEST F. EHRHARDT,
HOWARD E. J. INGLEY.